United States Patent [19]
Finnestad et al.

[11] Patent Number: 5,825,177
[45] Date of Patent: Oct. 20, 1998

[54] DEVICE FOR MEASURING THE SPEED OF A RAIL-MOUNTED VEHICLE

[75] Inventors: Askell Finnestad, Tanananger, Norway; Hakan Lind, Skarholmen, Sweden

[73] Assignee: ABB Daimler-Benz Transportation Signal AB, Stockholm, Sweden

[21] Appl. No.: 765,629

[22] PCT Filed: Jun. 26, 1995

[86] PCT No.: PCT/SE95/00783

§ 371 Date: May 12, 1997

§ 102(e) Date: May 12, 1997

[87] PCT Pub. No.: WO96/01431

PCT Pub. Date: Jan. 18, 1996

[30] Foreign Application Priority Data

Jul. 4, 1994 [SE] Sweden ................................ 9402350

[51] Int. Cl.$^6$ ................ G01P 3/80; G01P 3/66; B61L 25/00; B61K 9/10

[52] U.S. Cl. ............... 324/179; 246/122 R; 246/182 R; 324/171; 324/217; 324/243; 364/565

[58] Field of Search ................... 324/160, 171, 324/172, 178, 179, 217, 218, 232, 240–243; 180/169, 170; 246/122 R, 182 R, 168.1; 364/565, 424.024, 426.05; 340/441, 670

[56] References Cited

U.S. PATENT DOCUMENTS

| | | |
|---|---|---|
| 4,179,744 | 12/1979 | Lowe . |
| 4,283,031 | 8/1981 | Finch . |
| 4,560,928 | 12/1985 | Hayward ................... 324/171 |
| 5,141,183 | 8/1992 | Jurkowshi et al. . |
| 5,301,130 | 4/1994 | Alcone et al. ................... 324/178 X |

FOREIGN PATENT DOCUMENTS

| | | | |
|---|---|---|---|
| 0555801 | 2/1960 | Belgium ................... 324/172 |
| 2164312 | 6/1973 | Germany ................... 324/179 |
| 0080057 | 6/1980 | Japan ................... 324/178 |
| 2094981 | 9/1982 | United Kingdom ................... 324/179 |

OTHER PUBLICATIONS

Andemo et al., Hastighetsmatning med korrelationsmetod: Noggrann, beroringsfri, inga rorliga delar Teknisk tidskrift, vol. 3,1976, pp. 18–12.

Joppich et al., Radargestutzte Weg–und Geschwindigkeits- messung auf Schienenfahrzeugen, Signal+Draht, 85, 1993, pp. 360–364.

*Primary Examiner*—Gerard R. Strecker
*Attorney, Agent, or Firm*—Pollock, Vande Sande & Priddy

[57] ABSTRACT

A rail mounted vehicle speed measuring device includes a first magnetic field generating member and a first magnetic field sensing member positioned at a first measuring location on the vehicle; a second magnetic field generating member and a second magnetic field sensing member positioned at a second measuring location on the vehicle, spaced a fixed distance from the first location in the direction of vehicle movement; wherein the magnetic fields generated by the first and second magnetic field generating member are influenced by the rail to produce first and second signal patterns sensed by the first and second sensing member and varying with movement of the vehicle along the rail; and device is provided for correlating the first and second sensed signal patterns to determine the time displacement between the two sensed signal patterns and the velocity of the vehicle.

28 Claims, 12 Drawing Sheets

DEVICE FOR MEASURING THE SPEED OF A RAIL-MOUNTED VEHICLE

This application is a 371 of PCT/SE 95/00783, filed Jun. 26, 1995.

TECHNICAL FIELD

The present invention relates to a device for speed measurement in a rail-mounted vehicle.

BACKGROUND OF THE INVENTION

It has long been desired to be able to measure the speed of a rail-mounted vehicle accurately and with a high reliability over the whole speed range of the vehicle and under all operating conditions. It is desirable to be able to obtain an accurate speed value, by integration, the distance covered by the vehicle and hence the position of the vehicle along the track, such information being required by superordinate traffic control systems. Further, it is desirable to obtain accurate speed value for information to systems for control of vehicle slip during acceleration or deceleration. In addition, it is important to obtain accurate speed measure also at very low speeds.

Also, for reasons of reliability and cost, it is desirable that means for speed measurement and position determination be arranged in their entirety on the vehicle and that they be completely, or to the greatest possible degree, independent of external means, such as stationary signalling or measurement systems arranged at the track or at some other location.

The prior art discloses the use of tachometer generators connected to the wheels of the vehicle. However, slipping of the wheels when driving or braking entails unavoidable measurement errors with such equipment. Further, the measures of speed and distance obtained from a tachometer generator are dependent on the current wheel diameter. This changes with time, both by wear and by the wheels being turned down, which is done at regular intervals. The influence of the diameter change may, to a certain extent, be compensated by recurring calibrations and adjustments of the measurement system, but the need thereof entails an essential drawback. Under all circumstances, a tachometer generator system probably cannot provide a higher accuracy in, for example, distance measurement than about 10 to 30 percent.

The article entitled "Hastighetsmätning med korrelationsmetod", Andermo, Mörk, Sjölund, Teknisk Tidskrift 1976, No. 3, pages 18–21, has proposed (FIG. 3 with description) that the speed of a rail-mounted vehicle be measured optically in a contactless manner with the aid of a correlation method. A sensor mounted in a bogie has two light-emitting diodes which illuminate the rail at two different locations at a known distance from each other. The reflected radiation is sensed at both locations with the aid of photodiodes. One of the sensed signals is displaced in time until a maximum correlation is obtained between the two time-variable signals. The time displacement, together with the known distance between the measuring locations, then determines the speed of the vehicle and, by integration, also the distance covered. However, in practice, it has been found that optical systems are sensitive to the heavy fouling of detectors, etc., which is unavoidable during vehicle operation. Further, particles present between the rail and the sensor, such as, for example, raindrops, snow, and brake dust, result in disturbances of the measurement, among other things by heavy damping of the optical signals. Therefore, it has proved to be difficult, or impossible, to obtain a high reliability and high measurement accuracy during operation in vehicle environment using equipment of the above-mentioned type.

In the publication of Jopping, Wennrich: "Radargestützte Weg- und Geschwindigkeitsmessung auf Schienenfahrzeugen, Signal+Draht, 85 (1993), pages 360–364, a system for speed and road measurement during vehicle operation with the aid of a Doppler radar is described. Such a system has proved to be less sensitive to fouling than an optical system. During vehicle operation in the winter in Nordic or arctic climates, however, the unavoidable presence of snow and ice coating obstructs the radar radiation to such a high extent that the system cannot be used under such conditions. Further, in measurement equipment of this kind, it has proved to be difficult to obtain the required accuracy of measurement at low vehicle speeds.

U.S. Pat. No. 4,179,744 describes a device for checking the function of electric rail-mounted vehicles. The device has one or more stationary sensors placed along the rail, which are connected to stationary measurement amplifiers and signal processing equipment. When the vehicle passes the sensors, these detect the electromagnetic fields from the traction equipment of the vehicle. This makes possible control and analysis of the function of the traction equipment. By arranging two such sensors at a known distance from each other along the rail, and by allowing the signal processing equipment to determine the time displacement between the signals from the two sensors, the speed of the vehicle may be calculated. The device requires stationary installations and it may only provide information about the vehicle speed at the moment when the vehicle passes the sensors and cannot provide the continuous speed information which is required for, for example, position determination or slip control.

U.S. Pat. No. 4,283,031 describes a device for use in connection with railway crossings. It disclose the use of stationary sensors arranged along the rail for determining, for example, the length of the train, the number of cars, the train speed and direction. Each sensor is arranged near the rail and senses those changes in an electromagnetic field, generated by the sensor, and caused by wheel passages. By determining the time between the passages by a vehicle wheel past two sensors arranged at a known distance from each other, the train speed may be determined. The device involves the same disadvantages as the device described in the preceding paragraph.

U.S. Pat. No. 5,141,183 describes a device in a handling system (e.g. an overhead travelling crane or an industrial robot arranged on a trolley) comprising a carriage movable along a rail. The carriage has current collectors running along stationary contact rails. On the rails, magnetized strips are arranged which have regions with alternately opposite magnetization directions. The current collector is provided with a sensor which senses the field from the strip and counts the regions which are passed. If the regions have known dimensions, the speed of the car may be determined. This device also requires stationary members (the magnetic strips) and may, therefore, only give speed information upon the actual passage of the stationary members.

SUMMARY OF THE INVENTION

The invention provides a device of the kind described in the introductory part of the description, which, within the whole speed range of the vehicle, exhibits a high reliability and high accuracy of measurement under very severe operating conditions, and is able to work completely independently of means or systems arranged outside the vehicle.

Further, an object of the invention is to provide a device which makes possible a reliable detection of non-movement of the vehicle.

The invention also provides a device which makes possible detection of rail defects, such as cracks and rail failures.

BRIEF DESCRIPTION OF THE DRAWING

The invention will be described in greater detail in the following with reference to the accompanying FIGS. 1–9, wherein FIG. 1 shows a sensor means according to the invention;

FIG. 2b shows the configuration of the electronic system, arranged in the sensor itself, in the means according to FIG. 2a.

FIG. 2c shows the configuration of the circuits for signal processing of each one of the two sensor signals in the means according to FIG. 2a.

DESCRIPTION OF THE PREFERRED EMBODIMENTS

The examples of electric and mechanical dimensioning information occurring in the following description are only approximate.

Figure 1A:
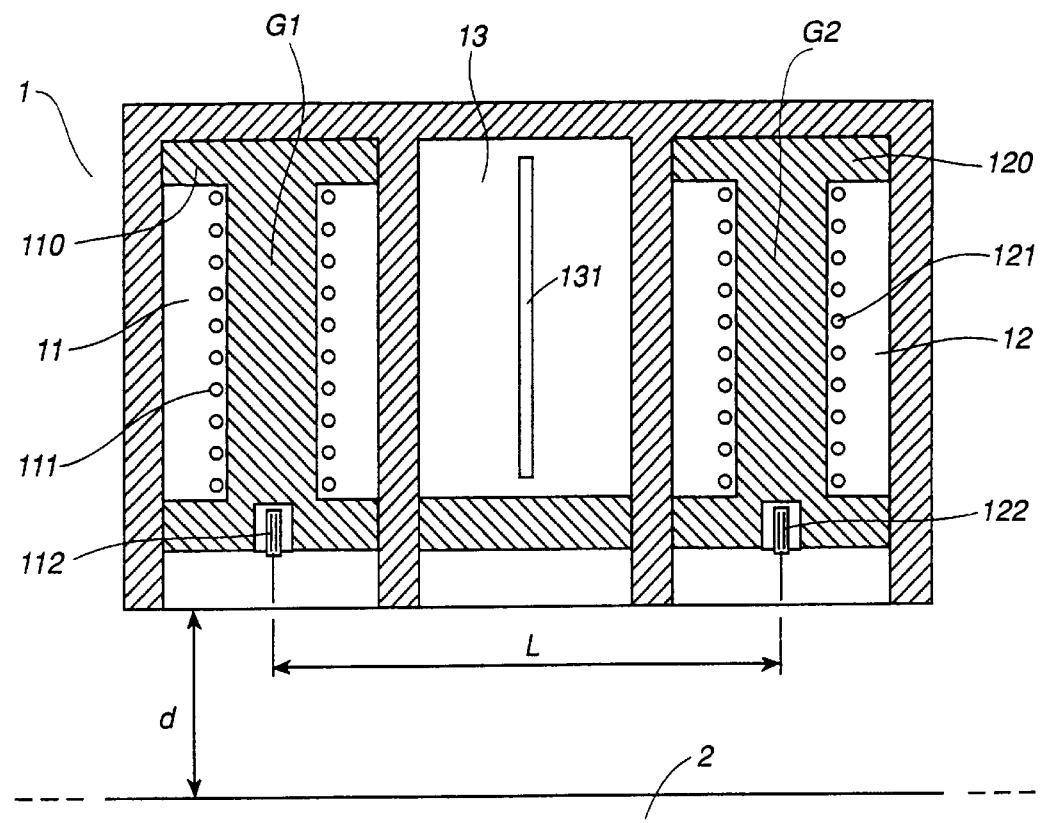
FIG. 1a shows the means of FIG. 1 viewed from the side.
Figure 1A:
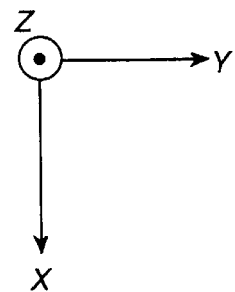

FIG. 1a shows a sensor means according to the invention. It is arranged on a vehicle bogie above a rail 2, the longitudinal direction of which coincides with the direction of movement of the vehicle and lies in the plane of the paper. The sensor means comprises a housing 1 made of electrically conducting material, for example aluminium. The electrically conducting house walls provide screening between the sensors and against disturbances from external fields.

The housing 1 has three spaces 11, 12 and 13. In each of the spaces 11 and 12 a sensor, G1 and G2, respectively, is arranged. Each sensor has a coil frame 110 and 120, on which a magnetization coil 111 and 121, respectively, is arranged. The magnetization coils have substantially vertical longitudinal axes. Each coil has a length of about 80 mm, a diameter of about 22 mm, consists of about 150 turns and is fed with an alternating voltage with a frequency of about 100 kHz. In the lower parts of the coil frames 110 and 120, grooves are milled perpendicularly to the direction of movement, and in these grooves sensor coils 112 and 122 are arranged. Each sensor coil has a height of about 7 mm and a width (perpendicular to the direction of movement of the vehicle) of about 25 mm and consists of about 250 turns. The sensor coils are arranged to be rotatable to a certain extent around axes perpendicular to the plane of the paper for adjustment of the coils such that their sensing directions become perpendicular to the direction of the magnetizing field.

The distance "d" between the lower part of the sensor means and the upper surface of the rail 2 is, for example, about 50–100 mm. It is adapted with respect to the deflection of the bogie and to the reduction of the diameter of the vehicle wheels which arises when the wheels are turned down which is normally done at certain intervals.

The distance L in the direction of movement between the axes of the two sensors is about 100 mm in the example shown. Each sensor system (with at least two sensors) is measured individually to obtain an equivalent "electrical distance", $L'_{EL}$, which is then stored in a non-volatile memory (e.g. an $E^2$ memory). This distance, $L'_{EL}$, is then utilized as calibration value by the signal processing unit.

In the common space 13 between the two sensors, certain electronic equipment is arranged on a printed circuit-board 131. In the example described, this electronic equipment includes pre-amplifiers for the signals from the sensor coils and bandpass filters for the sensor signals.

The housing 1 is provided with connection devices (not shown) for supplying voltages to the magnetization coils and for the output signals from the printed circuit-board 131 and with the necessary connections between the sensor coils and the printed circuit-board.

Further, FIG. 1a shows the coordinate system used hereinafter in the description. The X axis of the system is vertical and parallel to the longitudinal axes of the magnetization coils. The Y axis is parallel to the longitudinal direction of the rail, and hence to the direction of movement of the vehicle. The Z axis is horizontal and perpendicular to the longitudinal direction of the rail.

Figure 1B:
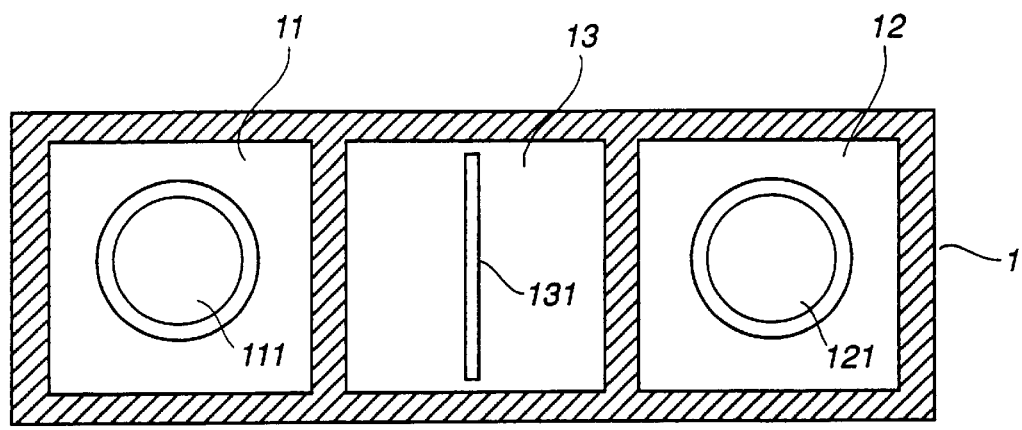
FIG. 1b shows the means of FIG. 1 viewed from above.
Figure 1C:
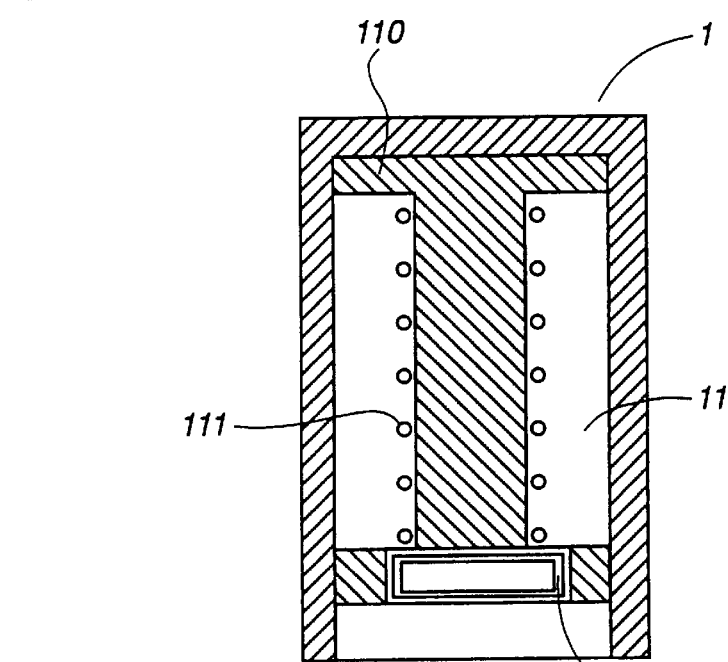
FIG. 1c shows the means of FIG. 1 viewed in the direction of movement of the vehicle.
Figure 1C:
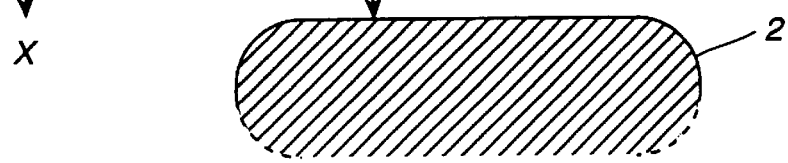

FIG. 1b shows a section through the sensor means viewed from above. FIG. 1c shows a section through the sensor means viewed from the front.

The magnetization coil of a sensor generates a magnetic alternating field, the magnetization field, with a substantially vertical main direction. Since the coil lies relatively close to the rail, the rail will influence the field. Factors which influence the field are the magnitude of the air gap between the sensor and the rail, the geometry of the rail (e.g. dimensional changes, damage, interruptions), and the permeability and conductivity of the rail.

During movement of the vehicle, variations in these factors will generate correlatable variations of the magnetic field configuration. However, the variations in the field are small compared with the magnitude of the magnetization field. Since the sensor coil of each sensor is separate, however, it may be oriented in space so as to select and sense that magnetic component which best represents the changes in the field caused by these variations in the properties of the rail. By orienting the sensor coils in the manner shown in FIG. 1, that is, orthogonally to the magnetization field, the sensitivity of the coils to the strong magnetization field is reduced to a very great extent. The field which is orthogonal to the magnetization field will, in this way, constitute a greatly increased percentage of the output signal from a sensor coil. In this way, it is possible to increase the sensitivity and the accuracy of the detection of the magnetic-field variations to a very great extent.

Figure 1D:
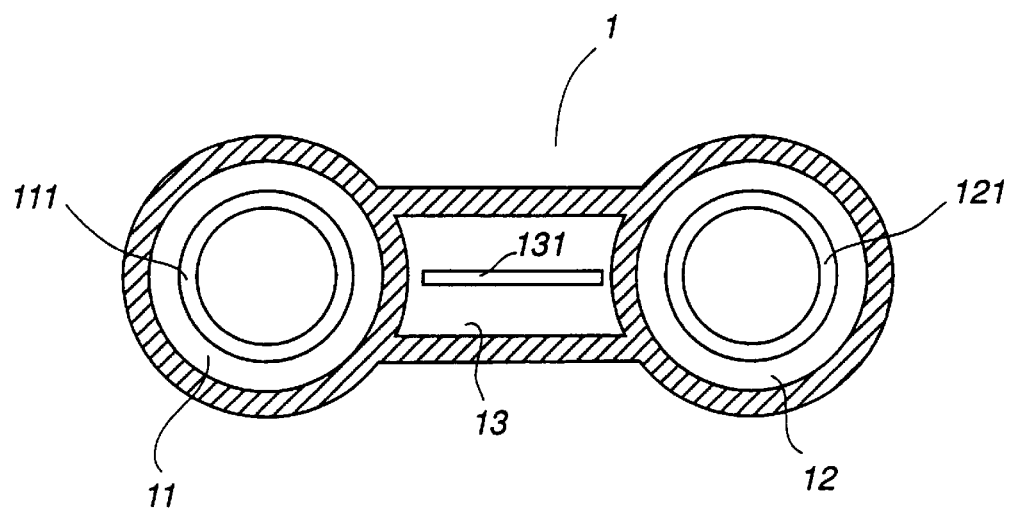
FIG. 1d illustrates a sensor means according to an alternative embodiment, viewed from above.

FIG. 1d shows, viewed from above, an alternative embodiment of the housing 1 of the sensor means. The housing comprises an extruded aluminum profile with two circular parts, which form the spaces 11 and 12 for the two sensors and which are separated by one part with plane-parallel walls which form the space 13 for the common electronic unit (the printed circuit-board 131).

Figure 1E:
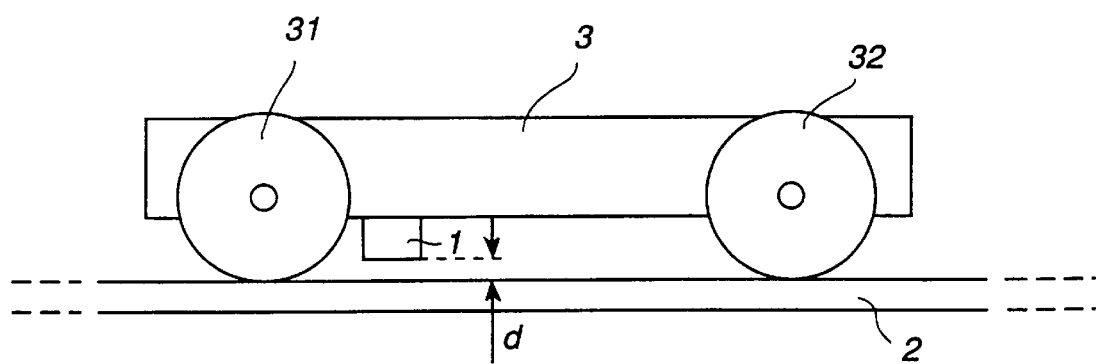
FIG. 1e illustrates an example of the mounting of the sensor means on the vehicle.

FIG. 1e shows an example of the mounting on the vehicle of the sensor means 1 shown in FIGS. 1a–1c. The sensor means is mounted on the underside of one of the bogies of the vehicle, namely, the bogie 3 with its two wheel sets 31 and 32.

Figure 2A:
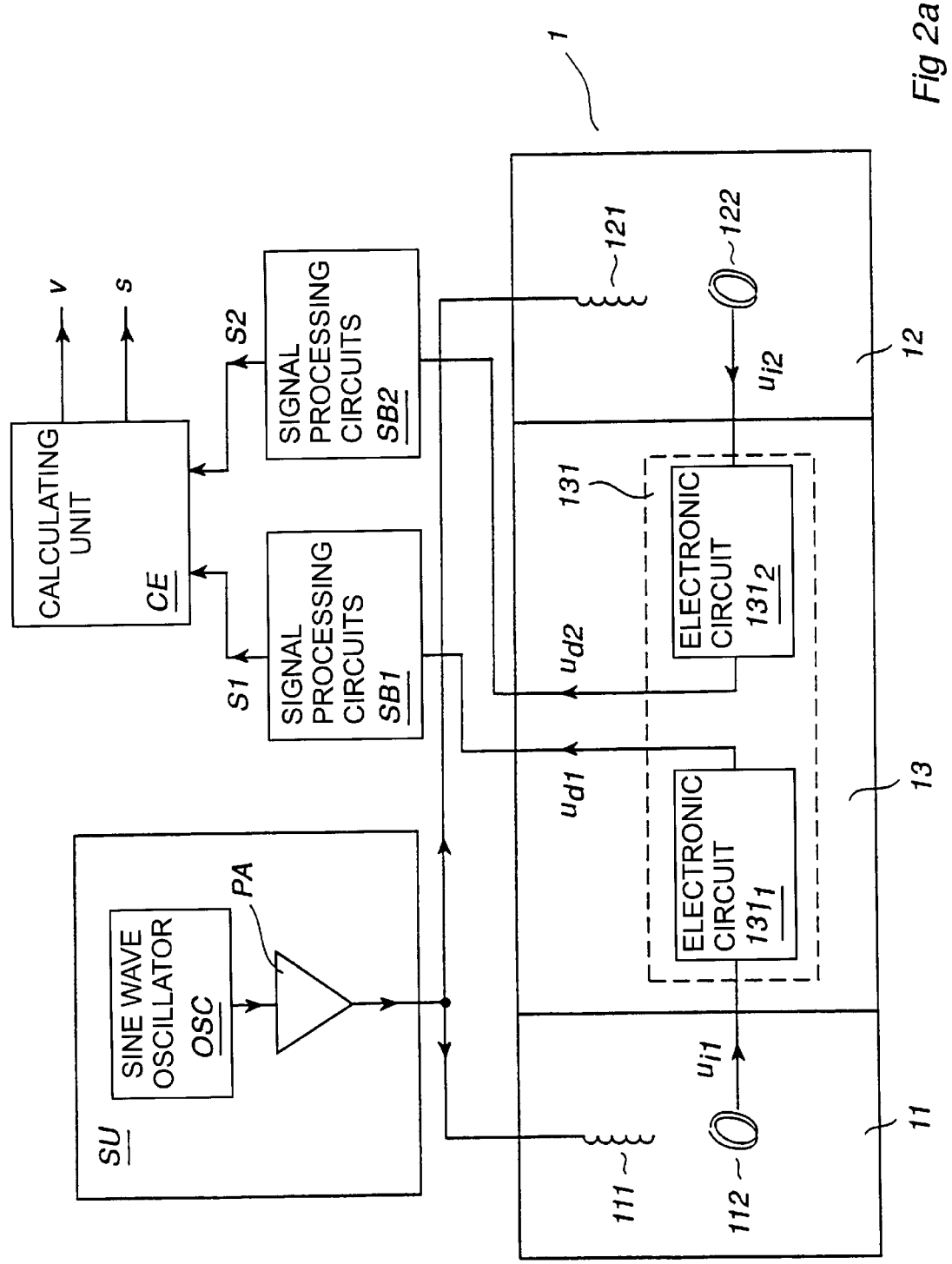
FIG. 2a shows a block diagram of a measurement device according to the invention.

FIG. 2a shows the sensor means according to FIG. 1 with associated equipment for feeding the field coils and for signal processing of the output signals of the sensor coils. A supply unit SU feeds the magnetization coils 111 and 121 with an alternating voltage with a frequency of about 100 kHz with the aid of a sine-wave oscillator OSC and a power amplifier PA. The output voltages $u_{i1}$ and $u_{i2}$ from the sensor coils 112 and 122 are supplied to the electronic circuits $131_1$ and $131_2$ arranged on the printed circuit-board 131. The output signals $u_{d1}$ and $u_{d2}$ from these circuits are supplied to signal processing circuits SB1 and SB2, which generate the digital signals S1 and S2. Each such signal constitutes a measure of the instantaneous value of the phase position of the field sensed by the respective sensor coil. The signals S1 and S2 are supplied to a calculating unit CE, which by means of, among other things, correlation of the two signals, calculates measured values of the speed v of the vehicle and the distances covered.

Figure 2B:
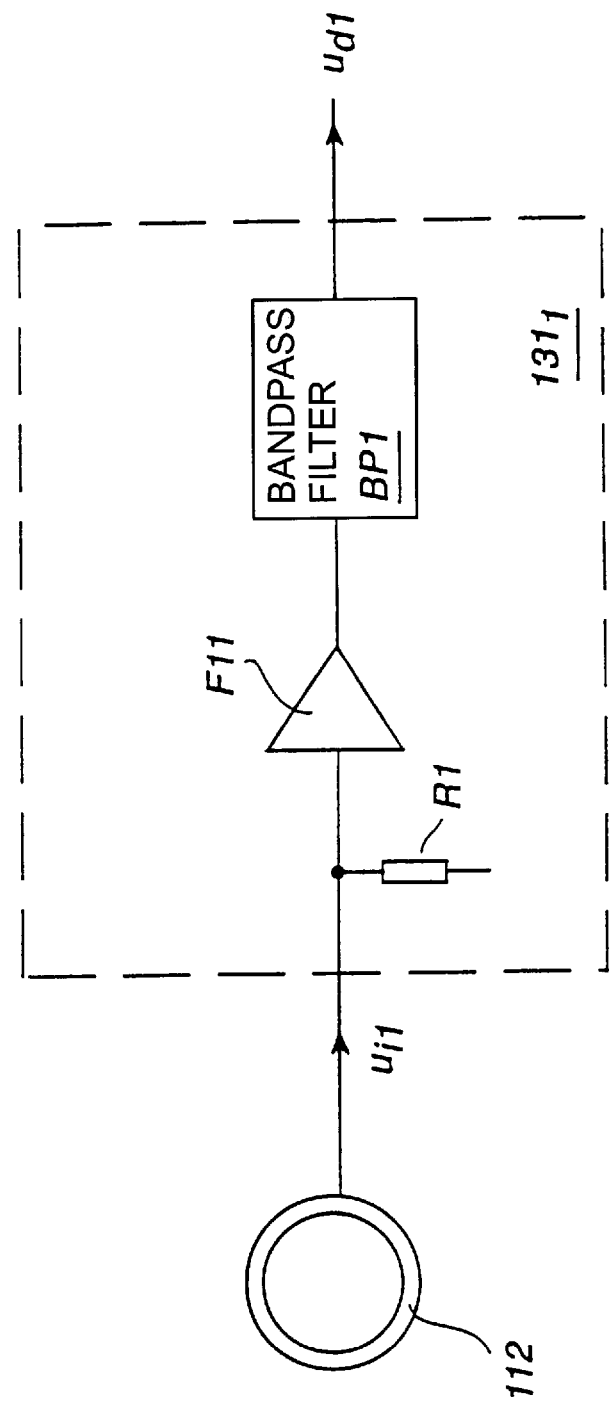

FIG. 2b shows the configuration of the electronic circuit $131_1$. The sensor coil 112 is connected to a load resistance R1 of 50 kohms. The voltage $u_{il}$ is supplied to an amplifier and impedance converter F11 with an amplification of 5–10 times and an output impedance of 50 ohms. The output signal of the amplifier is filtered in a bandpass filter BP1 for filtering away other signals than those which are derived from the magnetization field, which has a frequency of about 100 kHz. In the example now described, the filter has a passband with upper and lower limit frequencies about 150 kHz and 50 kHz, respectively. The output signal from the bandpass filter is designated $u_{d1}$.

The electronic circuit $131_2$ is built up in the same way as the circuit $131_1$.

Figure 2C:
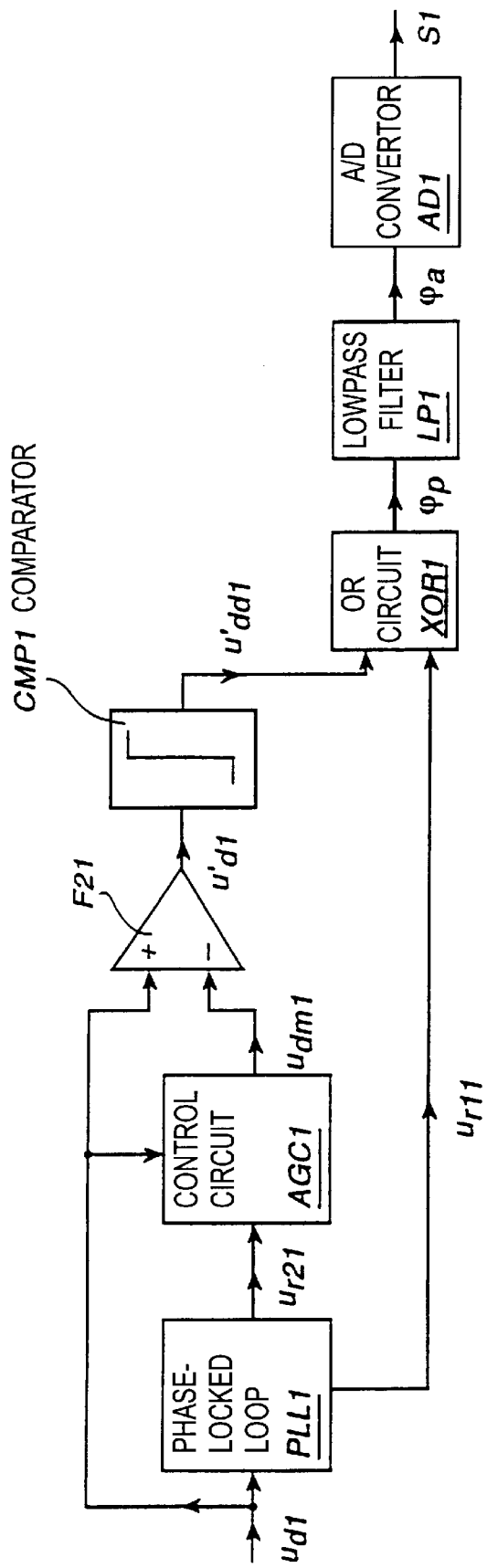

FIG. 2c shows the configuration of the signal-processing circuit SB1 shown in FIG. 2a. The signal $u_{d1}$ is supplied to a phase-locked loop PLL1 with a large time constant, one or a few seconds. This circuit has a phase position which corresponds to the mean value of the phase position of the input signal $u_{d1}$. The circuit generates two output signals with the same frequency as the input signal, that is, about 100 kHz. An output signal $u_{r21}$ has the same phase position as the input signal and is supplied to a circuit AGC1 for control of the working point of the sensor means. A second output signal consists of a square-pulse train $u_{r11}$ which is phase-shifted 90° from the former output signal and is supplied to an input of an exclusive OR circuit XOR1. The signal $u_{r11}$ serves as a phase-position reference when determining the phase position of the voltage generated in the sensor coil.

The circuit AGC1 is a circuit with a controllable gain. The output signal $u_{dm1}$ of the circuit has the same phase position and curve shape as the input signal $u_{r21}$ but a variable amplitude. The input of the circuit for control of the amplification is supplied with the signal $u_{d1}$. The peak value of this signal is detected, for example, in an envelope detector, and controls the amplitude of the output signal of the circuit in such a way that the amplitude of the output signal almost, but not quite, corresponds to the amplitude of the measured signal $u_{d1}$. The circuit AGC1 has a large time constant, for example one or a few seconds, and the output signal $u_{dm1}$ will therefore have the same frequency as the measured signal $u_{d1}$ and an amplitude and a phase position which nearly correspond to the mean values of the amplitude and the phase position of the measured signal $u_{d1}$.

In a differential amplifier F21, the signal $u_{dm1}$ is subtracted from the measured signal $u_{d1}$ and the difference constitutes the output signal $u'_{d1}$ of the amplifier. The circuit PLL1—AGC1—F21 now described will control the working point of the means such that the component in the output signal of the sensor coil which is caused by the magnetization field is eliminated to the desired extent. In this way, the sensitivity and the accuracy in detection of the field variations caused by the vehicle movement are increased, which variations are small compared with the magnetization field.

It has proved to be suitable to not completely eliminate the voltage component caused by the magnetization field, but to allow the output signal of the sensor coil to contain, for example, 100 mV of this component as a phase reference. The XOR gate requires an input signal $u'_{dd1}$ (FIG. 2c), which, on average, should be 90° phase-shifted relative to $u_{r11}$ which is obtained from the circuit PLL1. The latter circuit has found its phase position substantially from the component of the magnetization field. Therefore, a sufficiently large component from the magnetization field should also be present in the signal $u'_{dd1}$ and thus also in $u'_{d1}$.

The output signal $u'_{d1}$ of the amplifier F21 is supplied to a comparator CMP1 which emits a logic one if the input signal is larger than zero and a logic zero in the opposite case. The output signal $u'_{dd1}$ of the comparator, which signal is a square pulse train with the same phase position and frequency as the input signal $u'_{d1}$, is supplied to a second input of the XOR circuit XOR1.

If the two input signals to the XOR circuit are in phase, the output signal of the circuit becomes zero. If the input signals are in anti-phase, the output signal becomes 1. On average, the input signal $u'_{dd1}$ will have the same phase position as the measured signal $u_{d1}$, i.e., the phase difference between the two input signals to the XOR circuit will, on average, be 90°. Therefore, the output signal of the circuit will have the value ½, that is, the working point will, on average, lie in the center of the dynamic range of the circuit, which entails optimum utilization of the dynamic range.

The output signal $\phi_p$ of the XOR circuit consists of a pulse train with a frequency of about 100 kHz and with a mean value which, on average, has the value ½ and which may vary between the above-mentioned limits 0 and 1. In a low-pass filter LP1, the 100 kHz component and harmonics of this component, are suppressed, and the output signal $\phi_a$ of the filter is an analog signal which varies concurrently with the phase position of the output signal of the sensor coil. The output signal of the filter is amplified and converted into digital form in an A/D converter AD1 with the output signal S1.

The signal-processing circuit SB2 in FIG. 2a is built up in the same way as the circuit SB1 described above.

The signals S1 and S2 from the signal-processing circuits SB1 and SB2 in FIG. 2a are supplied to a correlation unit CE. This suitably comprises a microprocessor programmed to perform speed determination with the aid of, among other things, correlation of the two signals S1 and S2 and to calculate, by integration/summation of the speed values, the distance covered by the vehicle.

Each of the signals S1 and S2 is stored continuously as a sequence of a predetermined number of digital values, which thus always reproduce the variation of the signal during a certain time prior to the moment in question.

A continuous calculation of the correlation between the signals S1 and S2 is made when these are displaced by a varying time interval τ relative to each other. The time displacement $\tau_m$ which provides the highest value of the correlation integral is used as one subset for the speed determination. Further, the result of previous measurements (the previous history), modelling of the dynamic properties of the vehicle (the train), possibly other (less accurate) speed sensors, as, for example, a tachometer generator, are used as input data. The evaluation program, which is a statistical probability calculation with adaptive weights of the various input data, then provides an MLE (Maximum Likelihood Estimation) of the instantaneous speed of the vehicle. The speed of the vehicle is obtained as $$v = \frac{L'_{EL}}{\tau_{MLE}}$$

where $L'_{EL}$ is the equivalent "electrical distance" between the two sensors (see FIG. 1 with associated description)

$\tau_{MLE}$ is the value of t which gives the best possible correlation according to MLE.

Further, the device may be simply adapted to determine the direction of movement of the vehicle by shifting between S1 and S2 during the correlation and investigating in which order between the two signal patterns the correlation is obtained.

The microprocessor is adapted to carry out correlation analysis with a predetermined frequency, for example 10 measurements per second.

Figure 2D:
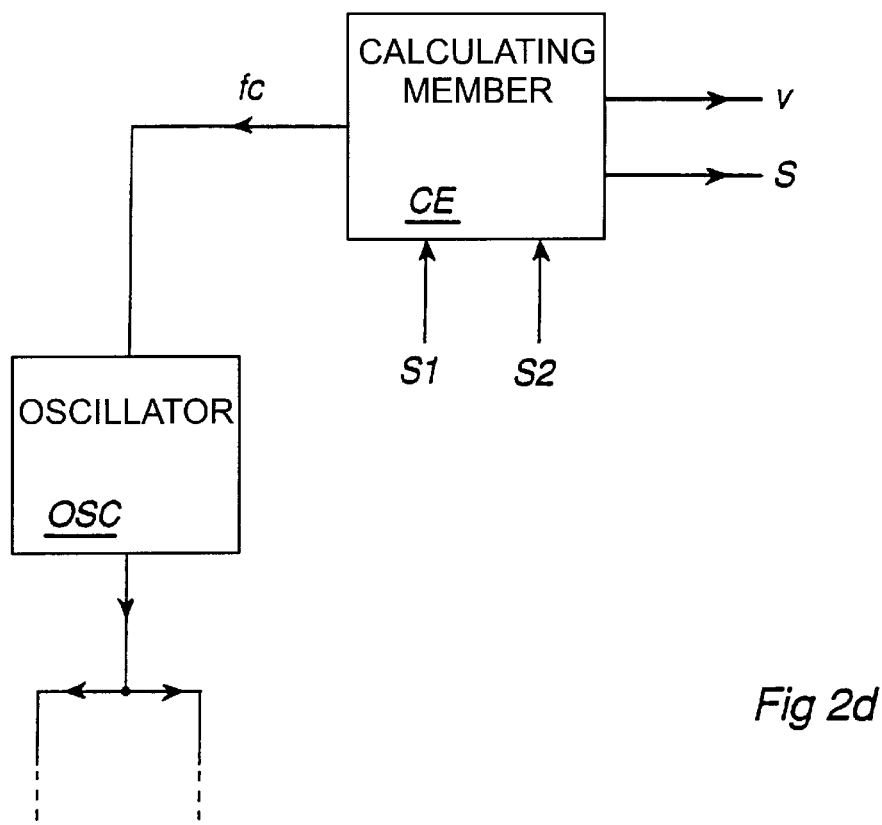
FIG. 2d shows how the device according to FIG. 2a may be supplemented in order to work alternately at two different frequencies.

FIG. 2d shows how increased reliability in the speed determination may be obtained by allowing the sensor means to operate alternately at two different frequencies, for example 70 kHz and 100 kHz. A control signal $f_c$ from the calculating member CE switches with a suitable periodicity, for example between each measurement, the oscillator frequency between these two values where necessary, filter circuits etc. in the signal-processing units SB1 and SB2 are also switched synchronously therewith. Since the depth of penetration of the field into the rail is different for the two frequencies, the sensed signal patterns will vary in different ways during the movement of the vehicle. However, the speed values calculated at one frequency shall, in principle, correspond to the values which are determined at the other frequency. If the values do not correspond; it is possible (if the difference is small) to form the mean value thereof, or (if the difference is great) to take this as an indication of a fault in the sensor means.

As an alternative to allowing the sensor means to alternately operate at different frequencies, two or more sensor systems and measurement channels, operating at different frequencies, may be arranged.

If desired, of course, two or more identical sensor means may be used on a vehicle to obtain a higher availability and increased reliability.

Figure 3:
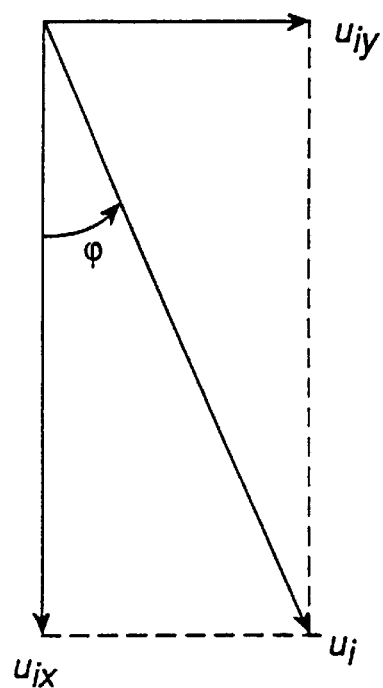
FIG. 3 shows in the form of a vector diagram the components of the output signal of the sensor coil.

FIG. 3 shows, in the form of alternating-voltage vectors, the output voltage $u_i$ of a sensor coil, which voltage is composed of the two components $u_{ix}$ and $u_{iy}$. That component in the output signal of a sensor coil which is directly caused by the magnetization field may, in practice, never be eliminated by adjusting the orientation of the coil. However, by the circuit for control of the working point of the means, described above with reference to FIG. 2c, this component may be further reduced to the desired degree. However, it has proved to be suitable not to eliminate the component completely, and therefore, in the output signal of the sensor coil, there is a component $u_{ix}$ which is caused by the magnetization field. The field variations in the direction of sensing of the sensor coil (orthogonally to the magnetization field), which are caused by the movement of the vehicle, will substantially provide a component $u_{iy}$ of the output signal of the sensor, which component has a 90° phase shift relative to the component $u_{ix}$. The variations of the component $u_{iy}$ cause variations of the phase position φ of the output signal of the coil relative to the phase position of the component $u_{ix}$ generated by the magnetization field. As mentioned, the orientation of the sensor coils orthogonally to the magnetization field entails a great reduction of the influence of the magnetization field on the output signal of a coil. The variations in the phase position of the sensor signal which are caused by the variations in the voltage component $u_{iy}$ therefore become greatly increased, which entails a good sensitivity and accuracy in the detection.

Figure 4:
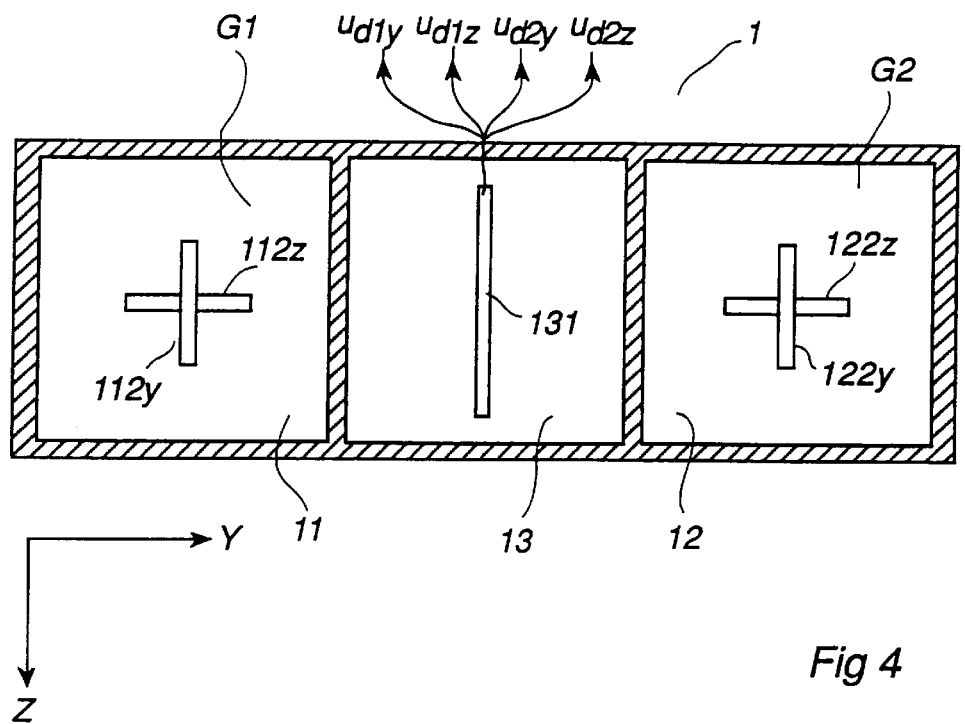
FIG. 4 shows an alternative embodiment of the sensor means according to the invention, with sensor coils in two directions orthogonal to each other.

FIG. 4 shows, viewed from above, a sensor means of the same type as that shown in FIG. 1. A sensor, G1 and G2, respectively, is arranged in each of the spaces 11 and 12 and each sensor has, in the same way as in FIG. 1, a magnetization coil (not shown) which generates an alternating field with a vertical main direction. Also, in the same way as in FIG. 1, each sensor has a sensor coil 112y and 122y, respectively, with their sensing directions in parallel with the Y-axis. In the means shown in FIG. 4, each sensor has an additional sensor coil, 112z and 122z, respectively, with its sensing direction in parallel with the z-axis.

From the sensor coils 112y and 122y, two sensor signals, here designated $u_{d1y}$ and $u_{d2y}$, are obtained, in the same way as described with reference to FIGS. 1 and 2, via electronic circuits 131 arranged in the sensor, which sensor signals are signal-processed and correlated with each other to form a measure of the speed v of the vehicle in the manner described with reference to FIG. 2. The signals $u_{d1z}$ and $u_{d2z}$ are processed in the same way, either by separate signal-processing circuits and calculating means, or by using the same circuits alternately for determining the vehicle speed from the signals from one of the pairs of coils and alternately from the signals from the other pair of coils. Possibly, one of the pairs of coils with its signal-processing circuits and calculating means may be used in the normal case and the other pair of coils with its signal-processing circuits and calculating means serve as a pair of stand-by coils to be activated in the event of a fault in the normally used system.

It has been found that sensor coils with their sensing direction in the y-direction are insensitive to fields which are caused by traction and signal currents flowing in the rail, and that this coil orientation may be preferable. This is not the case with coils which have their sensing direction in the z-direction, but the disturbing influence of the above-mentioned currents may to a great extent be reduced with the aid of some known disturbance elimination method, for example according to Swedish patent having publication number 441 720.

Figure 5:
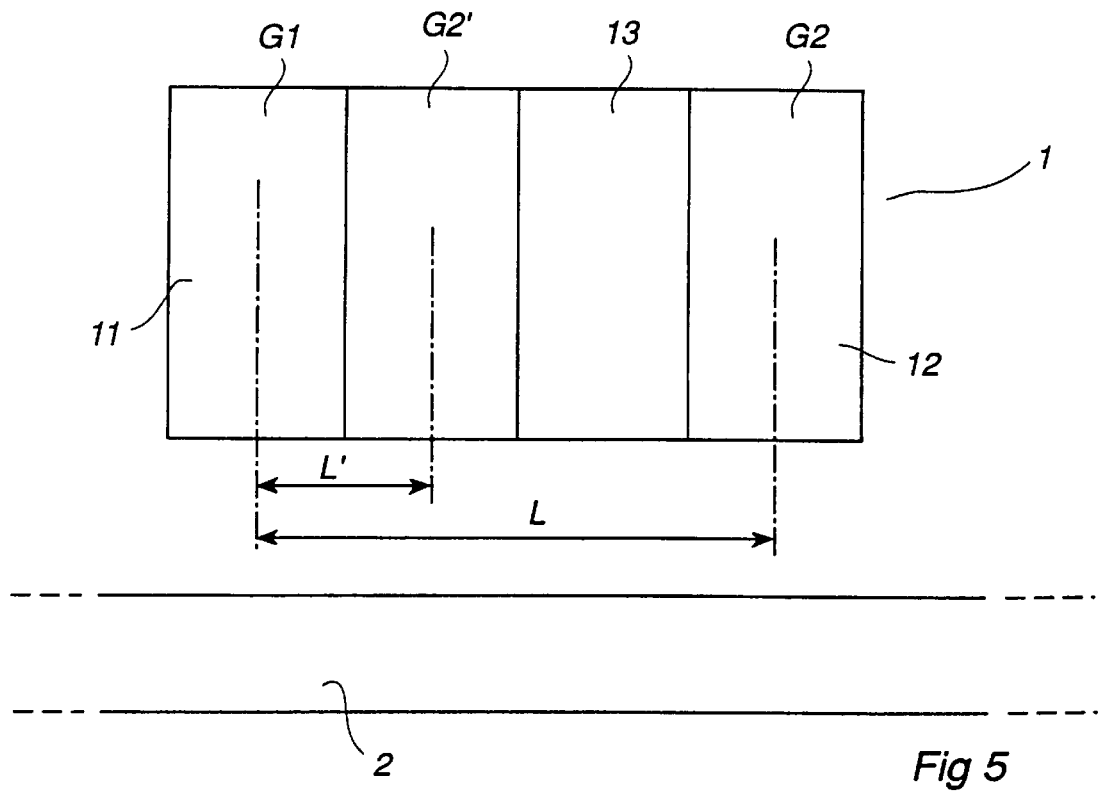
FIG. 5 shows a sensor means with three sensor units and with a possibility of choosing between two different measurement distances.

FIG. 5 schematically shows a sensor unit according to an alternative embodiment of the invention. It has three sensors, each designed as, for example, the sensors in FIG. 1. It has a sensor G1 and a sensor G2 in the same way as the sensor means of FIG. 1. The distance between the center lines of the sensors constitutes the measuring distance L. The sensor signals from the sensors G1 and G2 are correlated with each other in the manner described with reference to FIG. 2, and the speed of the vehicle is calculated by means of the measuring distance L.

Figure 6:
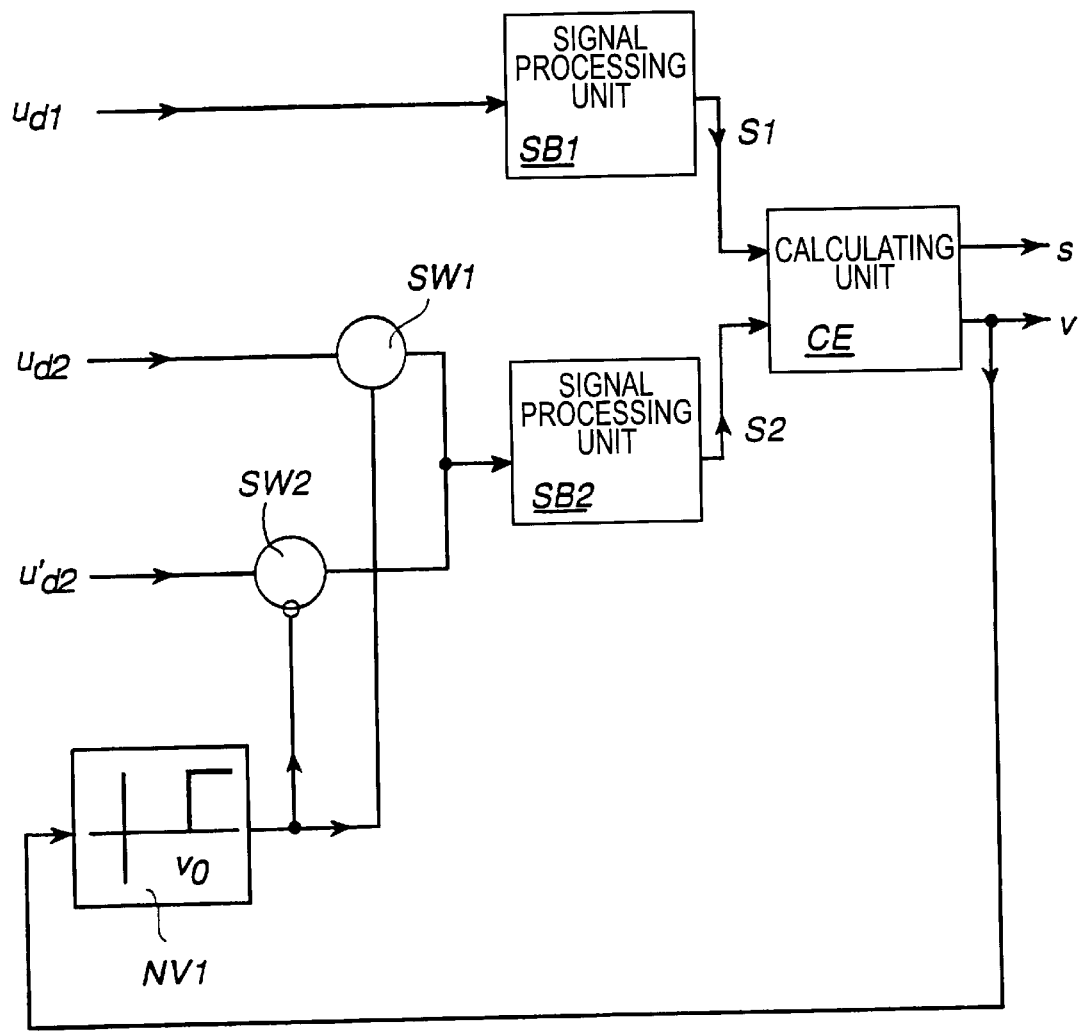
FIG. 6 shows how the switching between the measurement distances may be made in the device according to FIG. 5.

Between the sensor G1 and the common electronic space 13, a third sensor G2' of the same kind is arranged adjacent the sensor G1 and forms together therewith a shorter measuring distance L' with a length of, for example, 40 mm. At low vehicle speed, this shorter measuring distance provides considerably faster speed determination than the longer measuring distance L. As shown in FIG. 6, the choice of measuring distance may preferably be made automatically in dependence on vehicle speed. The signals $u_{d2}$ and $u'_{d2}$ from the sensors G2 and G2', respectively, are supplied to the signal-processing unit SB2 via electronic switching members SW1 and SW2. A level-sensing circuit NV1 is supplied with the calculated speed value v. If the speed is greater than a certain predetermined value $v_0$, the longer measuring distance is used, and the signal $u_{d2}$ is switched via the switching member SW1 into the signal-processing unit SB2. If the speed does not exceed the value $v_0$, the shorter measuring distance is activated by instead switching the signal $u'_{d2}$ via the switching member SW2 into the unit SB2.

Although the system described above with a suitable dimensioning may provide a good measurement result down to a very low speed, the measurement system unavoidably ceases to function when the speed approaches zero. In many applications, therefore, it is desirable to complete the system with an indication as to whether the speed of the vehicle is zero.

When the vehicle is stationary, S1 and S2 will be uncorrelated time sequences for all time displacements τ between the sequences. One method is to test for total independence when the estimated value of the speed is below a predetermined limit. When this hypothesis is verified at a given significance level, uncorrelated sequences are indicated. In addition, S1 and S2 will be approximately static sequences when the speed is zero. A low variance (RMS value) is, therefore, also an indication of the speed being zero.

Figure 7:
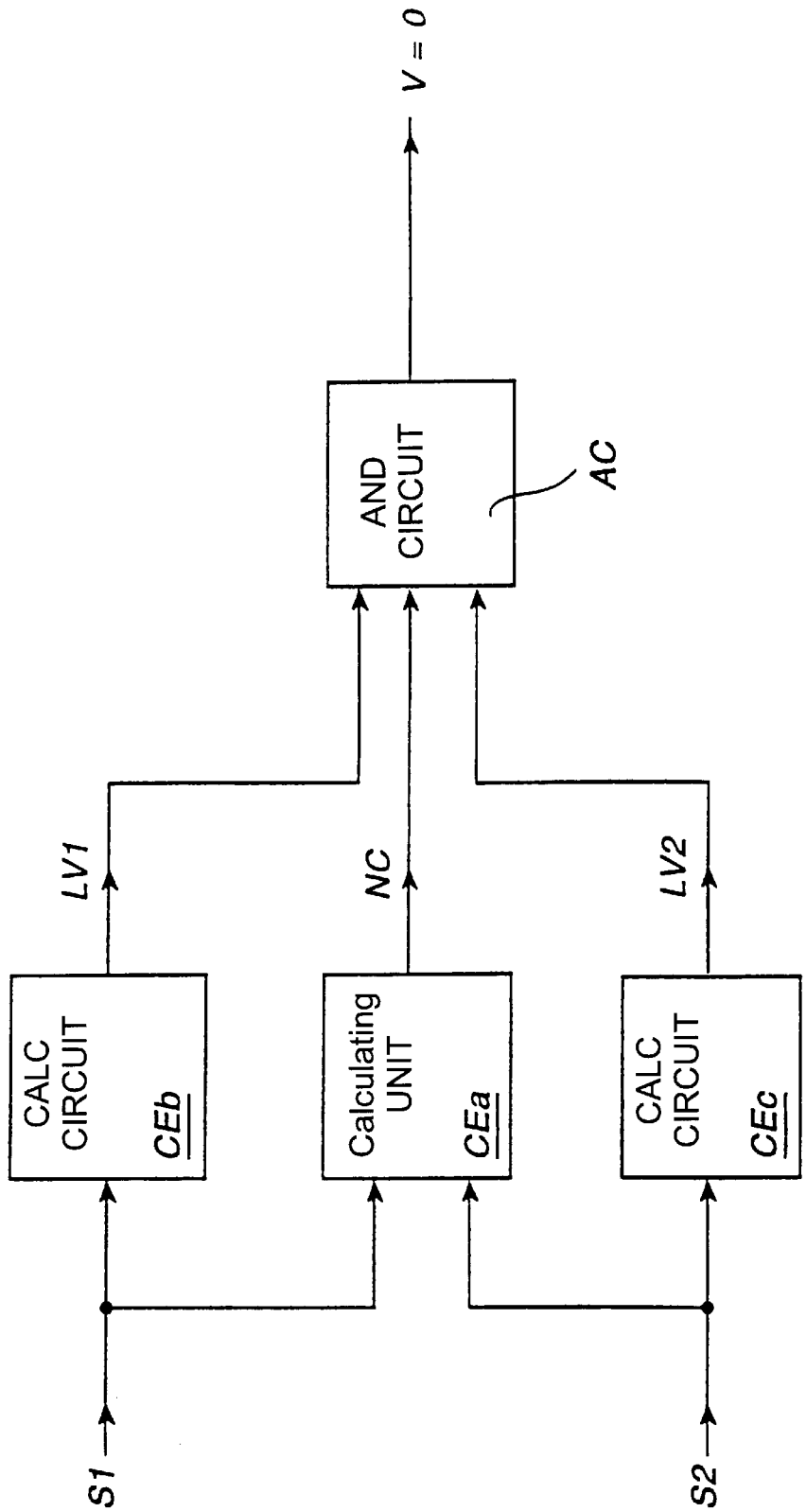
FIG. 7 shows an example of how the device according to the invention may be supplemented for detection of non-movement of the vehicle.

FIG. 7 shows how these tests may be combined. The calculating unit CEa is supplied with the signals S1 and S2 and delivers, if the above-mentioned test of the absence of correlation is fulfilled, a signal NC which indicates that the two signals are uncorrelated. The circuits CEb and CEc deliver signals LV1 and LV2 if the variance of the signals S1 and S2, respectively, lies below predetermined levels. The signals NC, LV1 and LV2 are supplied to an AND circuit AC which delivers an indicating signal V=0 if all three tests are fulfilled.

As an alternative to the tests described in the preceding paragraph, other known statistical standard tests for stationary state may be used.

The circuits shown in FIG. 7 suitably consist of parts of the program for a microprocessor which constitutes a control and calculating unit for the speed sensor.

Figure 8:
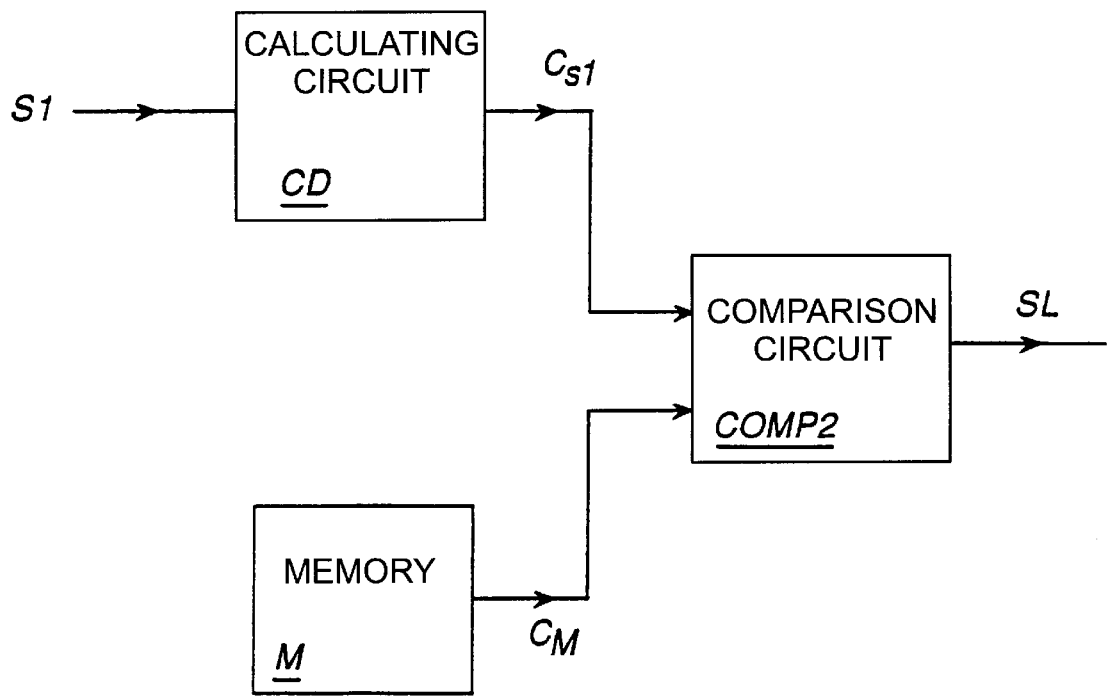
FIG. 8 shows an example of how the device according to the invention may be supplemented with means for detection of defects in the rail.

FIG. 8 shows how the device described above may be supplemented with means for detection of defects in the rail, such as cracks or rupture. The sensor signal S1 is supplied to a circuit CD which calculates one or more predetermined characteristics $C_{S1}$ of the signal, for example maximum amplitude or rate of change. That value, or those values $C_M$ of the corresponding characteristics, which occur at the defect or defects which are to be detected, are stored in advance in a memory M. A comparison circuit COMP2, a pattern recognition circuit, continuously compares the characteristic quantities $C_{S1}$ and $C_M$ and delivers a detection or alarm signal SL at a predetermined degree of correspondence.

Alternatively, the defect detection may be made by comparing that signal pattern, which the values of S1 for a certain period of time constitute, with the corresponding signal pattern stored in advance in the memory. The comparison between the signal patterns may possibly be made by time-shifting one of the patterns, in the same way as with the speed measurement described above, in relation to the other pattern until maximum correlation is obtained, whereby a fault is considered to have been detected if at least a predetermined degree of correlation is obtained.

Figure 9:
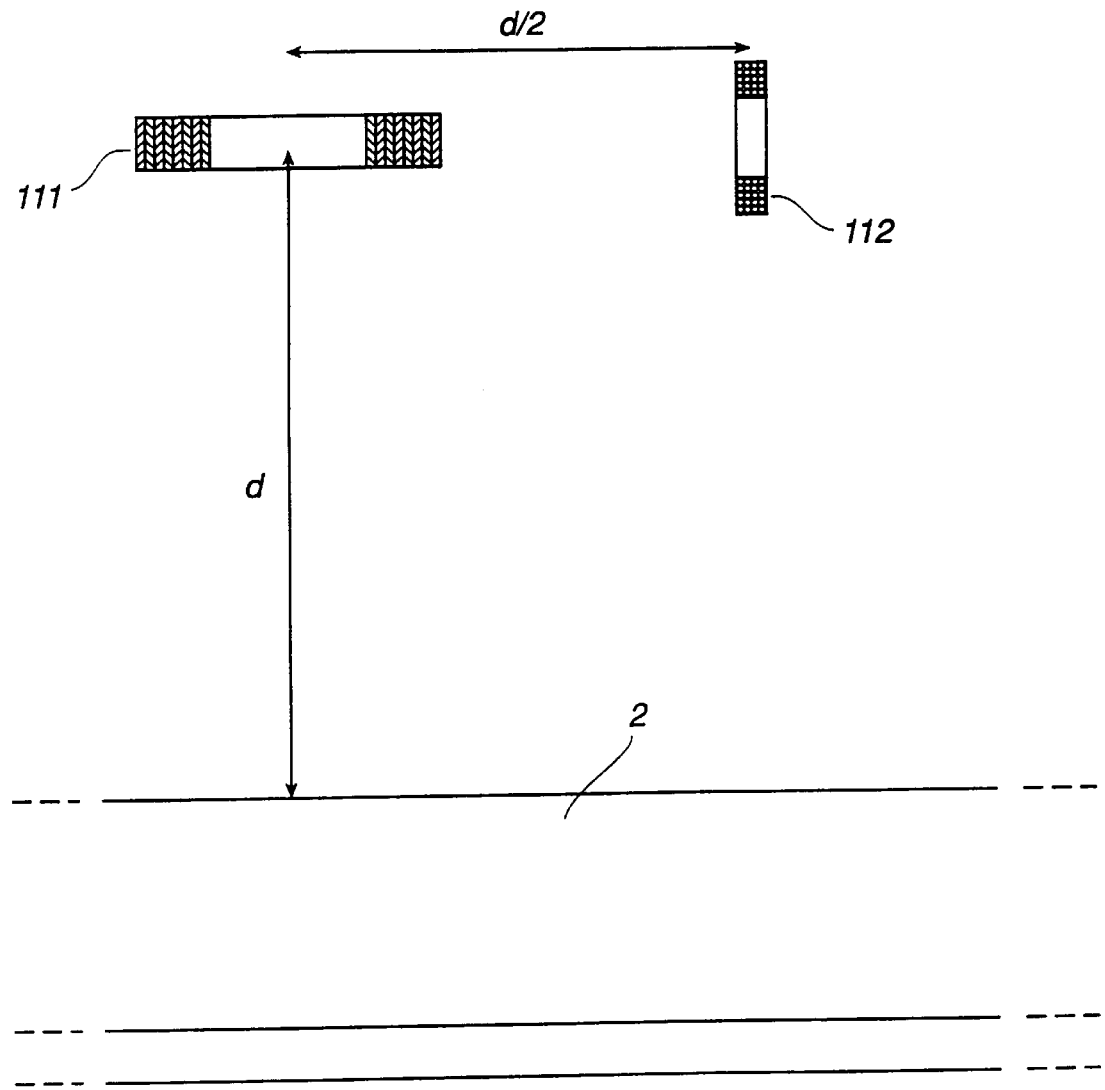
FIG. 9 shows an alternative embodiment of the magnetization and sensor coils of the sensor means.

FIG. 9 schematically shows an alternative and advantageous embodiment of the magnetization and sensor coil of a sensor (e.g. G1 or G2 in FIG. 1). The magnetization coil 111 is designed as a flat sheet-wound coil with a vertical axis. The coil has a considerably smaller length (extent in the vertical direction in the figure) than its diameter. By making the coil short, all its winding turns will be as close to the rail as possible, which provides a high magnetizing field intensity at the rail surface. The sheet winding is suitably performed in the manner shown in the figure, with a large number of turns of a thin sheet, which provides a large effective area and hence a lower effective resistance and a higher current-handling capacity than a corresponding wire winding, since at the frequencies used, the depth of penetration will be small because of the skin effect. Alternatively, however, the magnetization coil may, of course, be designed as a wire-wound coil.

The sensor coil 112 is arranged adjacent to the magnetization coil, and at the same height d above the rail 2 as this. As in the sensors described above, the sensor coil has a horizontal longitudinal axis and sensing direction. With the location shown, as well as with the sensors described above, the sensing direction of the coil will be perpendicular to the direction of the magnetizing field at the sensor coil. Since the sensor coil is arranged adjacent to the magnetization coil, the latter may be arranged nearer the rail, which provides a higher field intensity at the rail surface. It has proved to be particularly advantageous to arrange the sensor coil 112 displaced in the longitudinal direction of the rail by a distance from the magnetization coil which is approximately half (d/2) of the distance d between the magnetization coil 111 and the rail. At this distance, the magnetizing field intensity at the rail is highest, and a maximum induction is obtained in the sensor coil. The embodiment of the sensor shown in FIG. 9 has proved to provide good detection properties.

In the sensor means described above, the signals which are correlated are formed by sensing the phase position of the sensor signal. Alternatively, the amplitude component of the sensor signal may also be used.

Further, in the sensor means described above, each of the signals which are correlated is obtained from one single sensor coil. Alternatively, several sensor coils may be connected together to form such a signal, in which case the coils are oriented with different sensing directions, chosen in a suitable manner, for optimization of the sensitivity of the total output signal to the desired field variations and/or insensitivity to direct influence by the magnetization field.

For monitoring the function of the device, a separate monitoring winding may be adapted to sense the amplitude and/or phase of the magnetization field. In that case, a monitoring unit is adapted to trigger an alarm in the event of loss of the magnetization field, or if the characteristics of the field deviate from the desired ones.

We claim:

1. A rail mounted vehicle speed measuring device comprising:
    a first magnetic field generating means and a first magnetic field sensing means positioned at a first measuring location on the vehicle;
    a second magnetic field generating means and a second magnetic field sensing means positioned at a second measuring location on the vehicle, spaced a fixed distance from the first location in the direction of vehicle movement;
    wherein the magnetic fields generated by the first and second magnetic field generating means are influenced by the rail to produce first and second signal patterns sensed by the first and second sensing means and varying with movement of the vehicle along the rail; and
    means for correlating the first and second sensed signal patterns to determine the time displacement between the two sensed signal patterns and the velocity of the vehicle.

2. A device for speed measurement in a rail-mounted vehicle comprising:
    at least two sensors (G1, G2) which are arranged on the vehicle at a known distance (L) from each other in the longitudinal direction (Y) of the vehicle, each sensor including:
        field-generating means for generating a magnetization alternating field, surrounding the rail, and comprising a magnetization coil supplied with alternating current, and
        at least one sensor coil separated from the magnetization coil, for sensing field variations which are caused by the movement of the vehicle and being arranged with its sensing direction (Y) substantially perpendicular to the direction of the magnetization field, and
        members arranged on the vehicle and adapted to be supplied with the output signals ($u_{i1}$, $u_{i2}$) of the sensor coils, to form for each sensor a signal pattern (S1, S2) which corresponds to a time variation of the sensed field caused by the movement of the vehicle along the rail,
        to thereby determine, by correlation of the two signal patterns, the time displacement ($t_m$) between them, and to determine, on the basis of said time displacement and on the basis of the known distance between the measuring locations, the speed (v) of the vehicle.

3. A device according to claim 2, wherein the field-generating means generates alternating fields with a frequency exceeding 10 kHz.

4. A device according to claim 1, wherein the field-generating means generates alternating fields with one of at least two optional different frequencies ($f_1$, $f_2$).

5. A device according to claim 2, wherein the field-generating means generates alternating fields with one of at least two optional different frequencies ($f_1$, $f_2$).

6. A device according to claim 4, wherein the field-generating alternately operates at two different frequencies ($f_1$, $f_2$).

7. A device according to claim 2, wherein the magnetization coils are arranged with their longitudinal axes (X) substantially perpendicular to the longitudinal direction (Y) of the rail.

8. A device according to claim 7, wherein the magnetization coils are arranged with their longitudinal axes (X) substantially vertical.

9. A device according to claim 2, wherein in each sensor the sensor coil is arranged between the magnetization coil and the rail.

10. A device according to claim 2, wherein the sensor coils are arranged with their sensing directions (Y) substantially horizontal.

11. A device according to claim 10, wherein the sensor coils are arranged with their sensing direction (Y) substantially parallel to the longitudinal direction of the rail.

12. A device according to claim 10, wherein the sensor coils are arranged with their sensing directions (Z) substantially perpendicular to the longitudinal direction of the rail.

13. A device according to claim 2, wherein the magnetization coils and the sensor coils are ironless air coils.

14. A device according to claim 2, wherein the output signal ($u_{i1}$) of each sensor coil is adapted to be supplied to means for sensing variations in the phase position ($\phi$) of the signal.

15. A device according to claim 14, wherein means for sensing variations in the phase position of the signal comprises a phase-locked loop for generating a phase reference signal ($U_{r11}$).

16. A device according to claim 14, wherein the output signal ($u_{i1}$) of the sensor coil is adapted to be supplied to means for electronic control of the working point of the means for sensing variations in the phase position of the signal.

17. A device according to claim 16, wherein the means for electronic control of the working point comprise means for generating a signal ($u_{dm1}$) corresponding to the mean value of the sensor signal and means for subtraction of said signal from the instantaneous value ($u_{d1}$) of the sensor signal.

18. A device according to claim 2, further comprising a first sensor and a second and a third sensors arranged at different distances, from the first sensor and, selector means adapted to select, for correlation with the output signal ($u_{d1}$) from the first sensor, the output signal ($u_{d2}$, $u'_{d2}$) from one of the second and the third (G2') sensors.

19. A device according to claim 18, further comprising means for automatic selection of the output signal from the second or the third sensor in dependence on the speed (v) of the vehicle.

20. A device according to claim 2, wherein the sensed signal patterns are adapted to be supplied to means for detection of non-movement of the vehicle.

21. A device according to claim 20, wherein means for detection of non-movement of the vehicle comprise means for detection of the absence of variation of a signal pattern.

22. A device according to claim 20, further comprising means for detection of the absence of correlation of the signal patterns from two different sensors.

23. A device according to claim 2, further comprising means for storage of characteristics of a signal pattern occurring at a rail defect and means for detection of rail defects by continuous comparison between said stored characteristics and the corresponding characteristics of a signal pattern (S1) sensed during the movement of the vehicle.

24. A device according to claim 2, wherein the sensors are mounted on a vehicle bogie.

25. A device according to claim 2, wherein the extent of the magnetization coil in its longitudinal direction is considerably smaller than the diameter of the coil.

26. A device according to claim 25, wherein the magnetization coil is a sheet-wound coil.

27. A device according to claim 2, characterized in that the sensor coil is arranged at substantially the same vertical distance from the rail as the magnetization coil.

28. A device according to claim 27, wherein the sensor coil is displaced in the longitudinal direction of the rail in relation to the magnetization coil by a distance which constitutes approximately half of the distance between the magnetization coil and the rail.

\* \* \* \* \*